United States Patent [19]

Brandis et al.

[11] Patent Number: 5,200,019

[45] Date of Patent: Apr. 6, 1993

[54] APPARATUS FOR DEPOSITING SLIVERS ON DOUBLE-CURVED BODIES OR SURFACES

[76] Inventors: Hendrik Brandis, Moltkestrasse 9, 8000 Munchen; Jurgen Klenner, Stauffenstrasse 77, 8933 Untermeitingen, both of Fed. Rep. of Germany

[21] Appl. No.: 727,884

[22] Filed: Jul. 10, 1991

[51] Int. Cl.$^5$ ............................................. B32B 31/00
[52] U.S. Cl. ...................................... 156/523; 156/574
[58] Field of Search ................ 156/494, 468, 523, 574, 156/361, 247

[56] References Cited

U.S. PATENT DOCUMENTS 4,867,834  9/1989  Alenskis et al. .

FOREIGN PATENT DOCUMENTS 3743485  7/1989  Fed. Rep. of Germany .

Primary Examiner—David A. Simmons
Assistant Examiner—Chester T. Barry
Attorney, Agent, or Firm—Killworth, Gottman, Hagan & Schaeff

[57] ABSTRACT

An apparatus for depositing uni-directional pre-impregnated slivers 12 on double-curved bodies or surfaces 23 provides essentially a dispensing reel 11 for the sliver 12, two jockey rollers 13 and 14, a warping roller 30 and a shaping roller 40 which co-operates with it, a guide roller 21 and a pressing roller 22 for pressing the sliver 12 onto the surface 23. By sub-dividing the warping roller 30 into a number of rotatable roller segments 31 and by the possibility of changing the shaping roller 30 to any desired contours of double-curved surfaces, it is possible to achieve a variable running length of the fibres over the width of the sliver 12 and a smooth application of the sliver to any double-curved surfaces without creases or undulations.

4 Claims, 2 Drawing Sheets

APPARATUS FOR DEPOSITING SLIVERS ON DOUBLE-CURVED BODIES OR SURFACES

The invention relates to an apparatus for depositing slivers on double-curved bodies or surfaces in accordance with the preamble to claim 1.

Such an apparatus is known from U.S. Pat. No. 4,867,834. In the case of that construction, a plurality of individual fibres run over a heated shaft and are then combined together in grooved tracks to form a sliver which runs over pressing rollers which are adapted to the curved form of the receiving surface, during which process the sliver is appropriately stretched or compressed. The profiling of the heated sliver according to the curved form of the receiving surface therefore occurs directly on the receiving surface or surface to which the sliver is applied.

The invention is based on the problem of providing an apparatus of the type mentioned at the outset but in which the sliver, without being heated, is so shaped as it passes through the apparatus that it is automatically completely adapted to the surface to which it is to be applied prior to its running onto the pressing roller.

This problem is resolved by the features in claim 1. Advantageous further developments of the invention are disclosed in the sub-claims.

The invention makes it possible to achieve an even deposition of slivers on double-curved surfaces of any desired contour without heating. The basic consideration underlying the invention resides in the fact that a satisfactory result can only be achieved if the length of the path on which each individual fibre is deposited agrees for all fibres in the sliver with the fibre length deposited along this path. Since in the case of double-curved surfaces, the length of the receiving paths is not basically constant over the sliver width, the depositing apparatus must be capable of depositing different fibre lengths over the sliver width. The fibre length distribution over the sliver width which is proposed in accordance with the invention necessarily leads to relative longitudinal displacements of adjacent fibres and this in turn causes a warping or flow in the matrix connecting the fibres. The principle of incorporating this warping into the sliver in order to produce the relative longitudinal displacement with the fibres is the realisation between the dispensing reel and the pressing roller of a running length which is variable over the sliver width.

The invention will be described in greater detail hereinafter with reference to an example of embodiment shown in the accompanying drawings, in which.

Figure 1:
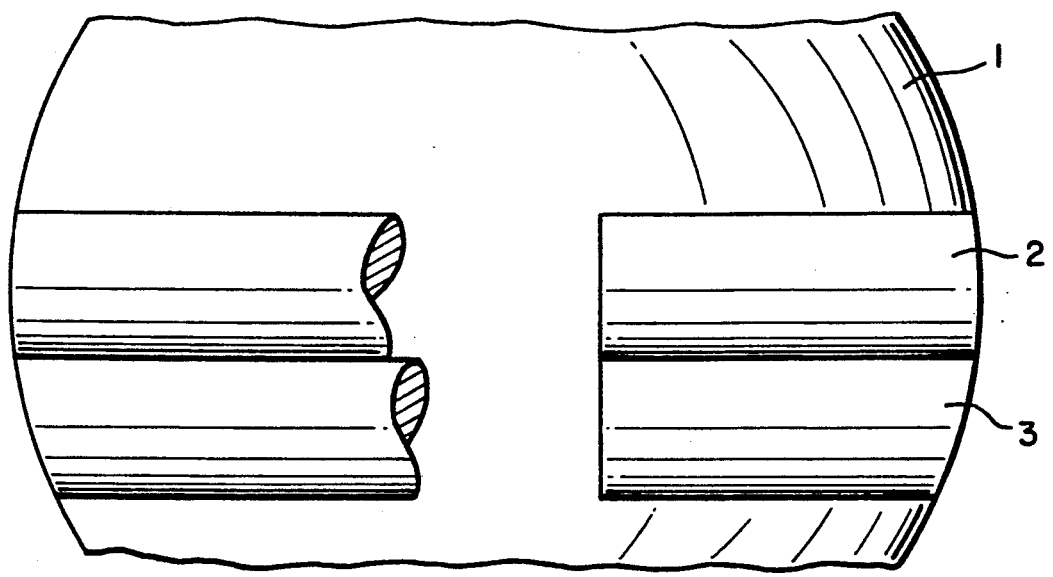
FIG. 1 shows slivers being deposited on a sphere.

FIG. 1 shows the resultant fibre length distribution when slivers are deposited on a sphere 1. A sliver 2 is deposited along the great circle of the sphere 1, the great circle constituting the natural path for every strip deposited on the sphere. In this context, the term 'natural path' must be understood as that path of a sliver on a surface such as is adopted when the sliver is being deposited without the influence of any external forces. Accordingly, a further sliver 3 is not deposited on the natural path and this is reflected in a noticeable increase in the differences in fibre length. When the sliver 3 is pressed against the sphere 1, undesired creases or undulations are created producing tolerance deviations from the spherical shape and resultant reductions in the strength of the wound spherical body.

Figure 2:
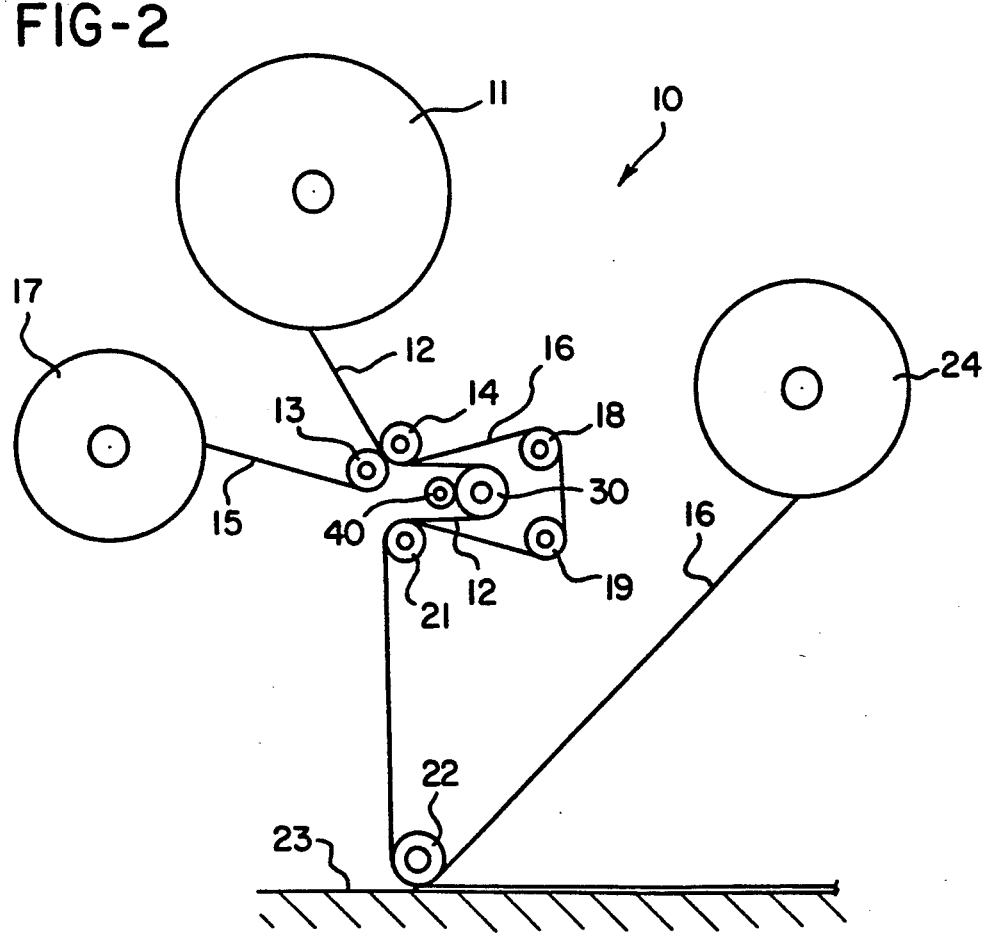
FIG. 2 shows an apparatus for depositing slivers on double-curved surfaces or bodies.

FIG. 2 shows an apparatus 10 which permits of a perfectly smooth deposition of slivers onto the sphere 1 or on any other double-curved surface. From a dispensing reel 11, a sliver 12 passes through jockey rollers 13 and 14 which serve to pull off a bottom protective film 15 disposed on the sliver 12 and also to pull off a top protective film 16. The bottom protective film 15 is wound onto a first take-up roller 17 while the top protective film 16 passes over guide rollers 18 and 19 and is subsequently applied again to the sliver 12. The sliver 12 is then passed around a warping roller 30 to a guide roller 21 at which the top protective film 16 is again applied to the sliver. From the guide roller 21, the sliver 12 passes to a pressing roller 22 which presses the sliver 12 onto a double-curved deposition surface 23. At this stage, the top protective film 16 is stripped off and wound onto a second take-up roller 24. A shaping roller 40 co-operates with the warping roller 30. Both rollers are described with reference to the further figures in the drawings.

Figure 3:
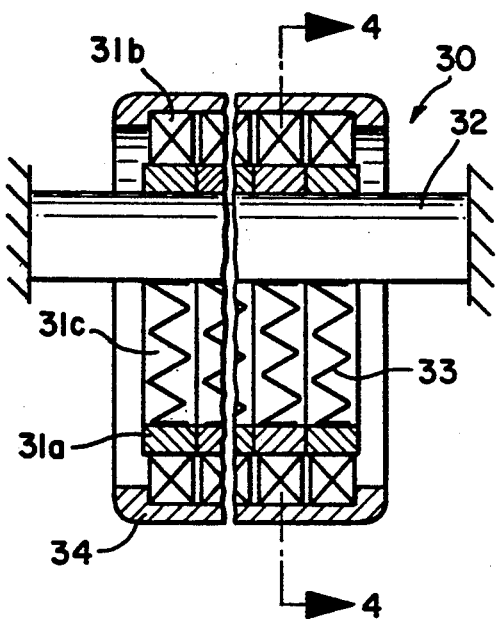
FIG. 3 shows a longitudinal section through a warping roller.
Figure 4:
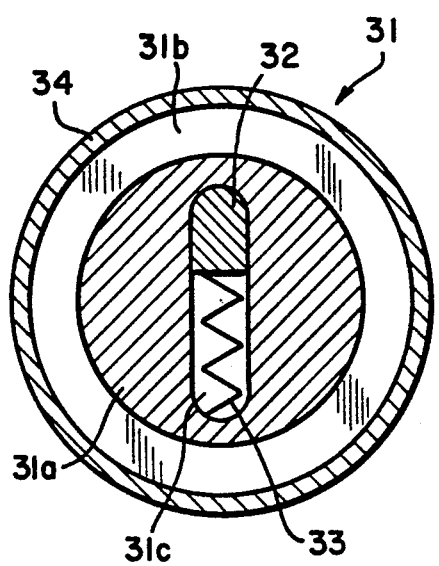
FIG. 4 shows a section taken on the lines IV—IV in FIG. 3.

FIG. 3 shows a longitudinal section through the warping roller 30. It consists of a number, e.g. 10, of adjacently disposed roller segments 31, each of which in turn consists of a bearing plate 31a onto which is shrink-fitted a ball bearing 31b. Provided in each bearing plate 31a and passing through all the bearing plates is a slot 31c through which a bearing strip 32 is passed. The bearing strip 32 is rigidly clamped at its ends and it is pressed against one end of the slots 31c by springs 33 which are provided in each bearing plate 31a. All the ball bearings 31b of the roller segments 31 are provided with one common flexible sheath 34. FIG. 4 shows a section through a roller segment 31. It can be seen that all roller segments 31 are displaceable in a specific radial direction in relation to the rigidly fitted bearing strip 32. Since the displaceable roller segments 31 are biased by the springs 33, when an external influence acts on the warping roller 30, they always seek to return to their starting position which is shown in FIGS. 3 and 4. The flexible sheath 34 guarantees a continuous contour of the warping roller 30 in the event of differing displacement of individual roller segments 31.

Figure 5:
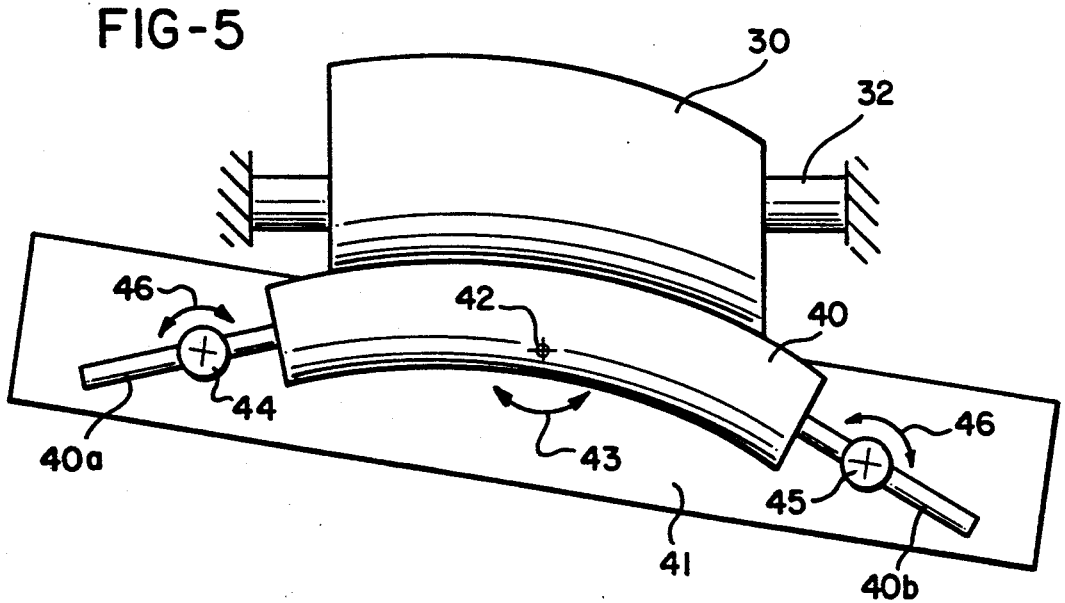
FIG. 5 is a view of the warping roller in accordance with FIGS. 3 and 4 and of a shaping roller arranged for the deposition of a sliver on a double-curved surface.

FIG. 5 shows how the contours of the passive warping roller 30 are controlled via a consciously manipulable elastic deformation of the shaping roller 40. Consisting of a flexible material, the shaping roller 40 is mounted on a carrier 41 which is mounted to rotate about an axis of rotation 42 which extends at right-angles to the roller axis, as indicated by arrows 43. The shaping roller 40 is provided with two bearing journals 40a and 40b, both of which are mounted in bearings 44 and 45 which are rotatable about their axis as indicated by the arrows 46. The bearing 46 is additionally displaceable in construction. The bearing journals 40a and 40b can be locked in their relevant position in the bearings 44 and 45 in a manner not shown in greater detail. By controlled rotation of the bearing journals 40a and 40b in their bearings 44 and 45 therefore the shaping roller 40 can be changed to any desired and clearly defined shape. By rotation of the carrier 41 about its axis 42, it is possible in addition to superimpose a linear attitude of the shaping roller 40 in respect of the warping roller 30.

Therefore, with a predetermined arrangement of the shaping roller 40, the apparatus 10 is capable via a variable running length of the fibres over the width of the sliver 12 to introduce a relative longitudinal displacement of the fibres in accordance with the differing length of the deposition paths. When this happens, the warping roller 30 rolls over the shaping roller 40 so that the contours of the warping roller 30 are adapted to the predetermined contours of the shaping roller 40. Prerequisite for a damage-free warping of the sliver is that on the contact surface between the warping roller and the sliver the local directions of movement of all points of sliver and warping roller are parallel. This cannot be achieved by the warping roller alone but only in conjunction with the warping roller rolling on the shaping roller.

We claim:

1. An apparatus for depositing uni-directional pre-impregnated slivers on double-curved bodies or surfaces, with a dispensing reel for paying out the sliver and a pressing roller for applying the sliver to the receiving surface, characterised in that after passing through two jockey rollers (13, 14) and before running onto the pressing roller (22) the sliver (12) passes over a warping roller (30) which by virtue of the contours of its working surface achieves a variable running length of the fibres in the sliver (12) and so compensates for differing lengths of the paths on which the individual fibres are deposited, the contours of the working surface of the warping roller (30) being achieved by a shaping roller (40) which is pressed against the warping roller (30) and alters its shape according to the varying lengths of the deposition paths.

2. An apparatus according to claim 1, characterised in that the sliver (12) is provided with a bottom protective film (15) and a top protective film (16) and in that the bottom protective film (15) can via the first of the two jockey rollers (13) be wound onto a first take-up roller (17) while the top protective film (16) can via the second Jockey roller (14) and two guide rollers (18, 19) be applied to the sliver again upstream of a guide roller (21) once the sliver has passed over the warping roller (30), the top protective film (16) then being passed by the pressing roller (22) to a second take-up roller (24).

3. An apparatus according to claim 1, characterised in that the warping roller (30) consists of a number of adjacently disposed roller segments (31), each roller segment (31) consisting of a bearing plate (31a) provided with an inner slot (31c) and onto which a ball bearing (31b) is shrink fitted, and in that a bearing strip (32) the ends of which are rigidly fitted into the apparatus, extends through the slots (31c) in all the bearing plates (31a), each bearing plate (31a) being pretensioned against the bearing strip (32) in the direction of the slot by a spring (33) disposed within the slot (31c) and in that the roller segments (31) are jointly enclosed by a resilient sleeve (34) surrounding the ball bearings (31b).

4. An apparatus according to claim 1, characterised in that the shaping roller (40) consists of an elastic material and has two bearing journals (40a, 40b) by which it is secured in bearings (44, 45) on a carrier (41) mounted to rotate about an axis (42) at right-angles to the longitudinal axis of the shaping roller (40) and in that both bearings (44, 45) are rotatably disposed on the carrier (41) and can be locked in their settings and that in addition one of the bearings (44, 45) is displaceable.

* * * * *